United States Patent
Tochigi

(10) Patent No.: US 11,261,034 B2
(45) Date of Patent: Mar. 1, 2022

(54) TRANSPORT DEVICE AND FREEZE-DRYING SYSTEM

(71) Applicant: Azbil Corporation, Tokyo (JP)

(72) Inventor: Hidenobu Tochigi, Tokyo (JP)

(73) Assignee: AZBIL CORPORATION, Tokyo (JP)

( * ) Notice: Subject to any disclaimer, the term of this patent is extended or adjusted under 35 U.S.C. 154(b) by 0 days.

(21) Appl. No.: 17/043,085

(22) PCT Filed: Apr. 10, 2018

(86) PCT No.: PCT/JP2018/015068
§ 371 (c)(1),
(2) Date: Sep. 29, 2020

(87) PCT Pub. No.: WO2019/198148
PCT Pub. Date: Oct. 17, 2019

(65) Prior Publication Data
US 2021/0016977 A1 Jan. 21, 2021

(51) Int. Cl.
*B65G 47/46* (2006.01)
*B65G 47/53* (2006.01)
*B65G 47/28* (2006.01)

(52) U.S. Cl.
CPC ............. *B65G 47/46* (2013.01); *B65G 47/28* (2013.01); *B65G 47/53* (2013.01)

(58) Field of Classification Search
CPC ......... B65G 47/46; B65G 47/53; B65G 47/28
USPC ........................................... 198/368
See application file for complete search history.

(56) References Cited

U.S. PATENT DOCUMENTS

| | | | | |
|---|---|---|---|---|
| 3,724,639 | A * | 4/1973 | Hara | B65G 47/82 198/430 |
| 3,990,566 | A * | 11/1976 | Nordqvist | B65B 21/06 198/418.5 |
| 5,472,077 | A * | 12/1995 | Bolin | B65G 47/82 198/430 |
| 2005/0131354 | A1* | 6/2005 | Tachikawa | A61M 5/31555 604/187 |

(Continued)

FOREIGN PATENT DOCUMENTS

| | | | |
|---|---|---|---|
| CN | 205555439 U | * | 9/2016 |
| ID | 202041016863 A | * | 4/2020 |
| JP | S50-19596 A | | 3/1975 |

(Continued)

OTHER PUBLICATIONS

International Search Report received for PCT Patent Application No. PCT/JP2018/015068, dated Jul. 10, 2018, 4 pages (2 pages of English Translation of International Search Report and 2 pages of International Search Report).

(Continued)

*Primary Examiner* — Gene O Crawford
*Assistant Examiner* — Lester Rushin, III

(57) ABSTRACT

A transport device having a plate; a conveyor to transport articles; a pusher to push and move a row of articles on the conveyor onto the plate; and a stopper to prevent the articles from being moved by the conveyor and to define the start of a row of articles being moved onto the plate by the pusher. The conveyor causes the positions of rows of articles stopped by the stopper to move alternately so that the positions of rows of articles moved onto the plate are shifted alternately.

10 Claims, 13 Drawing Sheets

(56) References Cited

U.S. PATENT DOCUMENTS

2013/0185952 A1    7/2013  Christ

FOREIGN PATENT DOCUMENTS

| | | |
|---|---|---|
| JP | S61-3204 U | 1/1986 |
| JP | S63-235214 A | 9/1988 |
| JP | H08-337212 A | 12/1996 |
| JP | 2008-044707 A | 2/2008 |
| JP | 4574326 B2 * | 11/2010 |
| JP | 4574326 B2 | 11/2010 |
| SE | 3572361 A * | 8/2019 |

OTHER PUBLICATIONS

European Patent Office, "Extended European Search Report," issued in European Patent Application No. 18 914 403.3, which is a counterpart to U.S. Appl. No. 17/043,085, dated Oct. 22, 2021, 7 pages.

* cited by examiner

TRANSPORT DEVICE AND FREEZE-DRYING SYSTEM

This application is a National Stage entry under 35 U.S.C. 371 of International Patent Application No. PCT/JP2018/015068, filed on Apr. 10, 2018, the entire contents of which are incorporated by reference herein.

TECHNICAL FIELD

The present invention relates to a transport device and a freeze-drying system.

BACKGROUND ART

For example, when manufacturing products such as pharmaceutical products and food products, containers such as vials may be stored in an oven to apply temperature treatment or pressure treatment such as freeze-drying treatment to contents in the containers. Typically, in the oven, a number of containers are arranged in an arrayed pattern. In the oven, in order to store as many containers as possible, the containers are arranged in a staggered manner such that recessed spaces between the containers in one container row receive parts of containers in an adjacent row when viewed from above (for example, see Patent Literature 1).

CITATION LIST

Patent Literature

PTL 1: Japanese Patent No. 4574326

SUMMARY OF INVENTION

Technical Problem

Not only for a manufacturing process of products such as pharmaceutical products and food products, a technology to arrange articles in a staggered manner without using a complex mechanism has been required. Accordingly, it is one of objects of the present invention to provide a transport device and a freeze dry system which enable staggered arrangement of articles without using a complex mechanism.

Solution to Problem

An aspect of the present invention provides a transport device including: a plate, a conveyor configured to transport articles, a pusher configured to push and transfer a row of the articles on the conveyor onto the plate, and a stopper configured to restrain movement of the articles by the conveyor and define a head of the row of the articles to be transferred onto the plate by the pusher, in which the conveyor is configured to move positions of the rows of the articles stopped by the stopper alternately such that the positions of the rows of the articles transferred onto the plate are shifted alternately.

The transport device described above may further include a vertical gate disposed between the plate and the conveyor and configured to move upward to prevent the articles from being transferred onto the plate while the articles are moving on the conveyor, and move downward while the row of the articles is being pushed by the pusher.

The transport device described above may further include an approach gate configured to restrain the movement of the articles on the conveyor and define a terminal end of the row of the articles to be transferred onto the plate.

The transport device described above may further include a counting sensor configured to count the number of the articles received between the stopper and the approach gate.

In the transport device described above, the approach gate may be closed when the number of the articles reaches a predetermined number.

In the transport device described above, the stopper may be fixed to the pusher.

In the transport device described above, the stopper may be fixed over the conveyor.

In the transport device described above, the conveyor may retract the position of the row of the articles stopped by the stopper every other time such that the positions of the rows of the articles transferred onto the plate are shifted alternately.

In the transport device described above, the articles may have a circular cross section and the conveyor may retract the row of the articles by the same distance as a radius of the circle.

In the transport device described above, the articles may be vials.

In addition, an aspect of the present invention provides a freeze dry system including: a freeze dry oven in which a plate is disposed in the interior thereof, a conveyor configured to transport articles, a pusher configured to push and transfer the row of the articles on the conveyor onto the plate, and a stopper configured to restrain the movement of the articles by the conveyor and define a head of the row of the articles to be transferred onto the plate by the pusher, in which the conveyor is configured to move the position of the row of the articles stopped by the stopper alternately such that the positions of the rows of the articles transferred onto the plate are shifted alternately.

The freeze dry system described above may further include a vertical gate disposed between the plate and the conveyor and configured to move upward to prevent the articles from being transferred onto the plate while the articles are moving on the conveyor, and move downward while the row of the articles is being pushed by the pusher.

The freeze dry system described above may further include an approach gate configured to restrain the movement of the articles on the conveyor and define a terminal end of the row of the articles to be transferred onto the plate.

The freeze dry system described above may further include a counting sensor configured to count the number of the articles received between the stopper and the approach gate.

In the freeze dry system described above, the approach gate may be closed when the number of the articles reaches a predetermined number.

In the freeze dry system described above, the stopper may be fixed to the pusher.

In the freeze dry system described above, the stopper may be fixed over the conveyor.

In the freeze dry system described above, the conveyor may retract the position of the row of the articles stopped by the stopper every other time such that the positions of the rows of the articles transferred onto the plate are shifted alternately.

In the freeze dry system described above, the articles may have a circular cross section and the conveyor may retract the row of the articles by the same distance as a radius of the circle.

In the freeze dry system described above, the articles may be vials.

In the freeze dry system descried above, the articles may be arranged in a staggered manner on the plate of the freeze dry oven.

Advantageous Effects of Invention

According to the present invention, a transport device and a freeze dry system which enable staggered arrangement of articles without using a complex mechanism can be provided.

DESCRIPTION OF EMBODIMENTS

Figure 1:
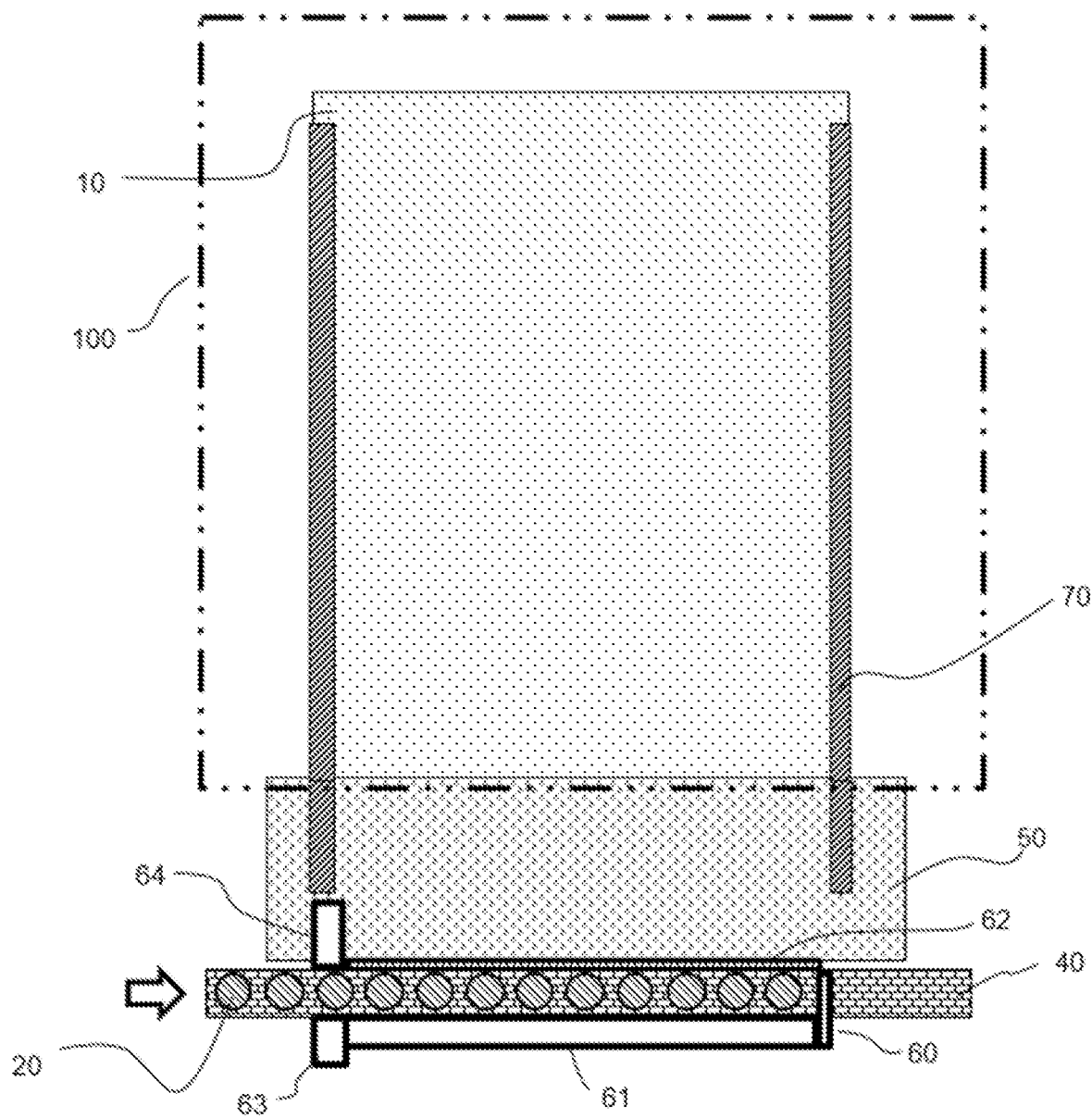
FIG. 1 is a schematic top view of a transport device according to an embodiment.

An embodiment of the present invention will be described below. In the drawings, the same or similar parts are designated by the same or similar reference signs. However, the drawings are schematic illustrations. Therefore, specific dimensions or the like are to be determined based on the following description. In addition, the drawings may include parts having different dimensional relationships and ratios from each other as a matter of course.

A transport device according to the embodiment includes, as illustrated in FIG. 1, a plate 50, a conveyor 40 disposed at a position adjacent to the plate 50 configured to transport articles 20, a pusher 61 configured to push a row of the articles 20 on the conveyor 40 and transfer the row of the articles 20 onto the plate 50, and a stopper 60 configured to restrain the movement of the articles 20 by the conveyor 40 and define a head of the row of the articles 20 transferred onto the plate 50 by the pusher 61. In the transport device according to the embodiment, the conveyor 40 moves the positions of the rows of the articles 20 stopped by the stopper 60 alternately such that the positions of the rows of the articles 20 to be transferred onto the plate 50 are shifted alternately in a direction of the row.

Figure 2:
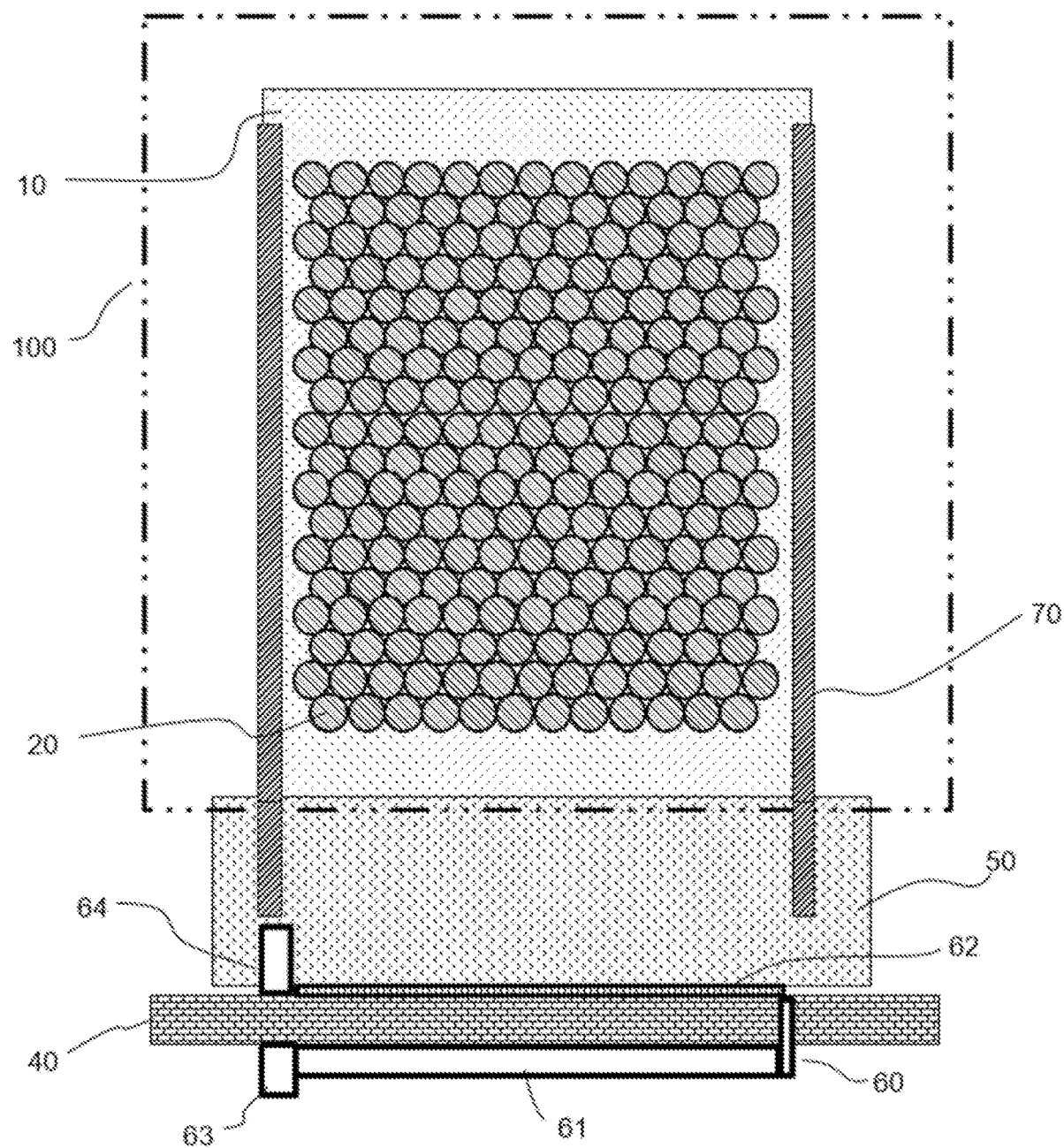
FIG. 2 is a schematic top view of the transport device according to the embodiment.

The transport device according to the embodiment is arranged, for example, at a position adjacent to a closed space 100 in which the articles 20 are stored. As illustrated in FIG. 2, a plate 10 for placing the articles 20 is arranged in the closed space 100. The closed space 100 may be provided, for example, by an oven, a tank, a storage room, and the like. In the closed space 100, at least one of a temperature and a pressure may be controlled. In the closed space 100, at least one of temperature distribution and pressure distribution may be controlled. The oven may be a freeze dry oven. The closed space 100 may be released by a door or the like.

Each of a plurality of the articles 20 is, but not specifically limited to, a container, such as a vial, that stores pharmaceutical products to be subject, for example, to treatment such as freeze drying. Each of the plurality of articles 20 includes, for example, a cylindrical shape. The plurality of articles 20 are arranged in a staggered manner (staggered arrangement) in the closed space 100 such that a larger number of articles 20 are arranged on the plate 10 in the closed space 100. Therefore, the plurality of articles 20 are arranged in an overlapped manner when viewed from the side. The plurality of articles 20 are arranged such that centers are alternating with each other by row when viewed from above.

For example, the respective centers of the articles 20 in a second row are shifted with respect to the respective centers of the articles 20 in a first row in the direction of the row. However, the respective centers of the articles 20 in a third row are not generally shifted with respect to the respective centers of the articles 20 in the first row in the direction of the row. The centers of the plurality of articles 20 may be recognized as being arranged at intersections of a triangle grid pattern. However, in this disclosure, a triangle forming the triangle grid pattern may be, and may not be a regular triangle.

A guide 70 may be provided in a vicinity of the plate 10 and the plate 50 to prevent the articles 20 pushed by the pusher 61 from spreading laterally with respect to a direction of travel of the pusher 61.

Figure 3:
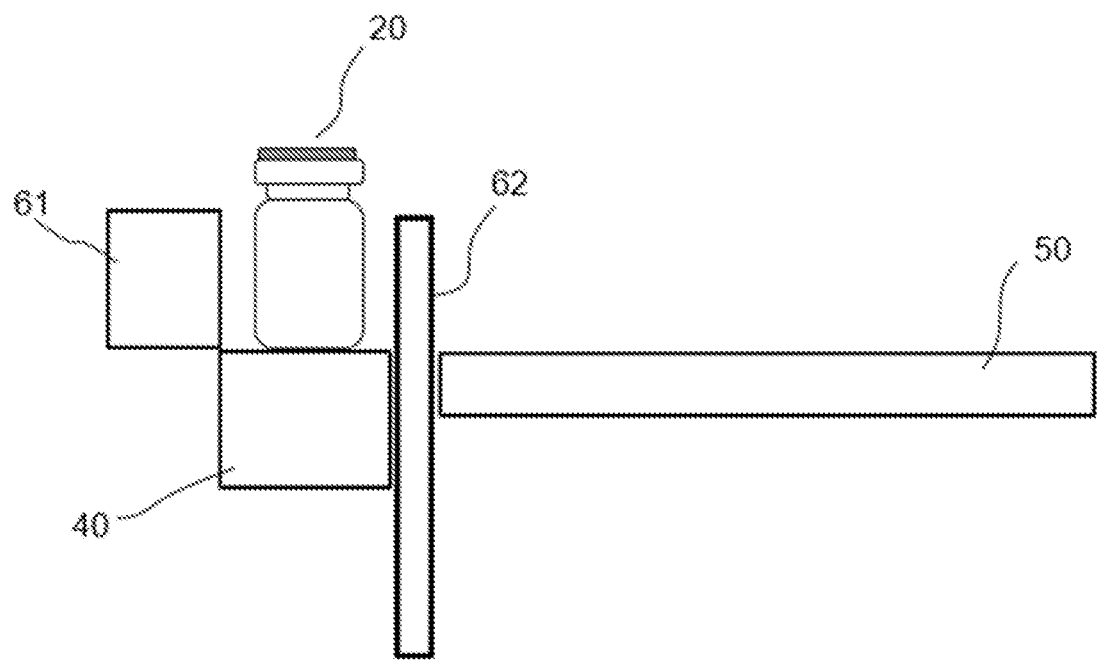
FIG. 3 is a schematic side view of the transport device according to the embodiment.

The plate 50 illustrated in FIG. 1 may be part of a bridge to be disposed between the conveyor 40 and the plate 10 in the closed space 100. The conveyor 40 is capable of transporting the articles 20 in a direction parallel to edges of the closed space 100 and the plate 50. The transport device according to the embodiment further includes a vertical gate 62 arranged between the plate 50 and the conveyor 40. The vertical gate 62 is movable in a direction vertical to upper surfaces of the plate 50 and the conveyor 40. As illustrated in FIG. 3, the vertical gate 62 is moved upward to a level higher than the upper surfaces of the conveyor 40 and the plate 50 while the conveyor 40 transports the articles 20 to prevent the articles 20 from being transferred onto the plate 50. The pusher 61 is located at a position which does not pose an impediment of transport of the articles 20 while the conveyor 40 transports the articles 20. The pusher 61 and the vertical gate 62 function as a guide for the articles 20 being transported. The conveyor 40 illustrated in FIG. 1 transports the articles 20 to be stored in the closed space 100 toward the stopper 60. The articles 20 are interposed between the pusher 61 and the vertical gate 62 and are transported toward the stopper 60.

Figure 4:
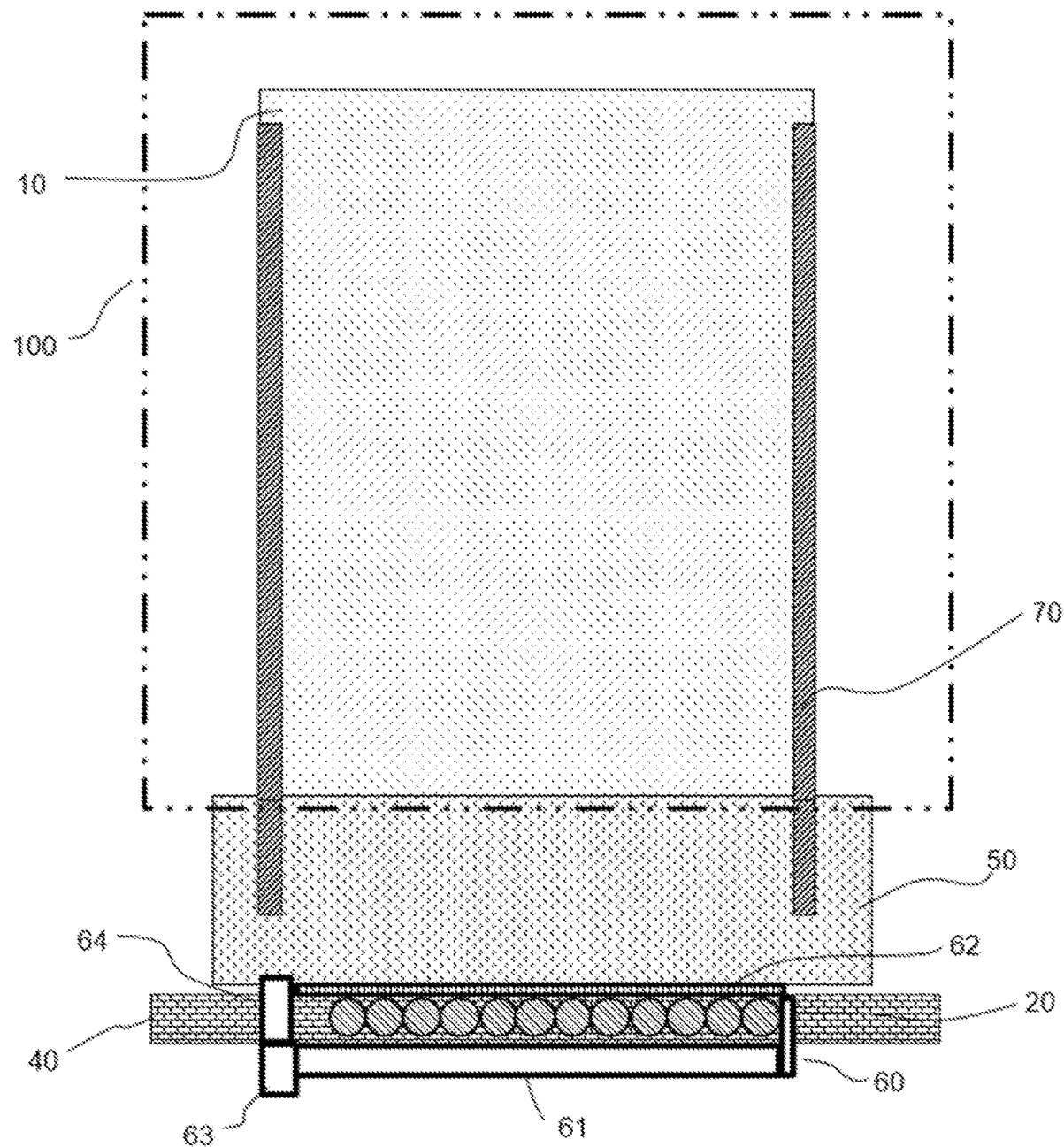
FIG. 4 is a schematic top view of the transport device according to the embodiment.

As illustrated in FIG. 4, the stopper 60 comes into contact with the side surface of the article 20 to stop the movement of the articles 20. The upper surface of the conveyor 40 continues to slide against bottom surfaces of the stopped articles 20 until the conveyor 40 is stopped. Following articles 20 transported by the conveyor 40 come into contact with the preceding articles 20 stopped by the stopper 60 one after another and are stopped from moving.

Figure 5:
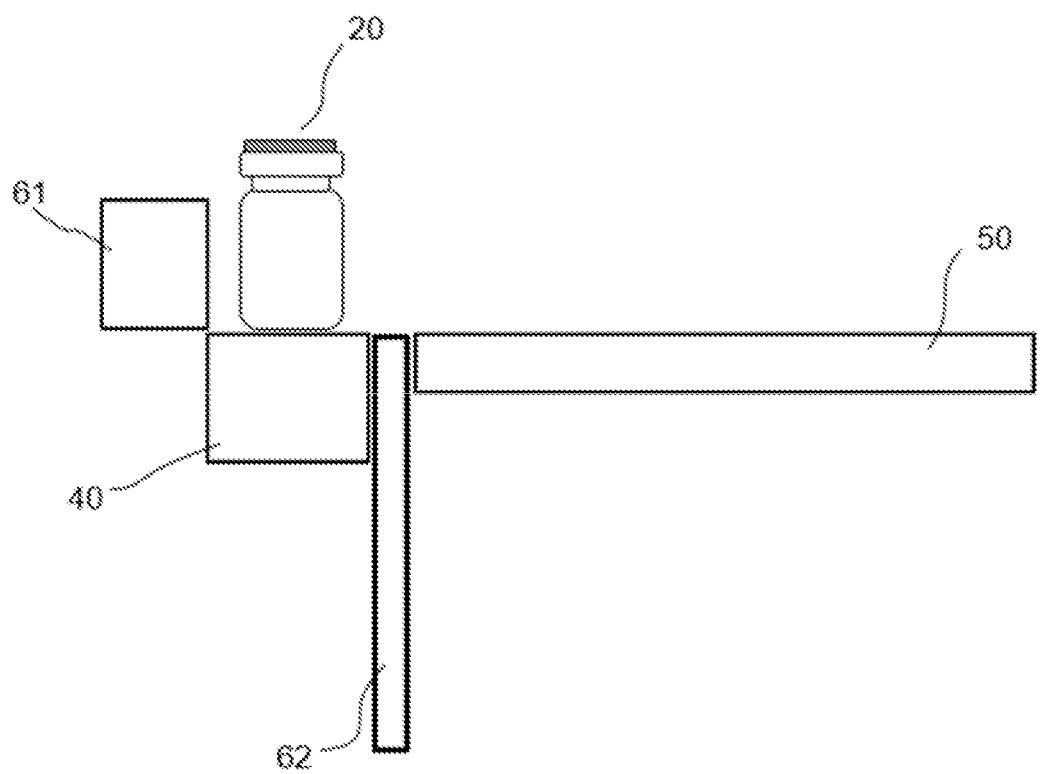
FIG. 5 is a schematic side view of the transport device according to the embodiment.

The transport device according to the embodiment further includes a counting sensor 63 configured to count the number of the articles 20 transported by the conveyor 40, and an approach gate 64 configured to restrain the movement of the articles 20 on the conveyor 40 and define a terminal end of the row of the articles 20 to be transferred onto the plate 50. The approach gate 64 is opened in the beginning. When the number of the articles 20 counted by the counting sensor 63 reaches a predetermined number which corresponds to one row of the articles 20 to be stored in the closed space 100, the counting sensor 63 transmits a trigger signal to the approach gate 64. The approach gate 64 that receives the trigger signal is closed. Therefore, the same number of the articles 20 as the number of the articles 20 in a row stored in the closed space 100 enter between the stopper 60 and the closed approach gate 64. Note that the head of the row of the articles 20 may reach the stopper 60 after the approach gate 64 is closed. Subsequently, the conveyor 40 stops driving. As illustrated in FIG. 5, the vertical gate 62 moves downward to a level lower than the upper surfaces of the conveyor 40 and the plate 50.

Figure 6:
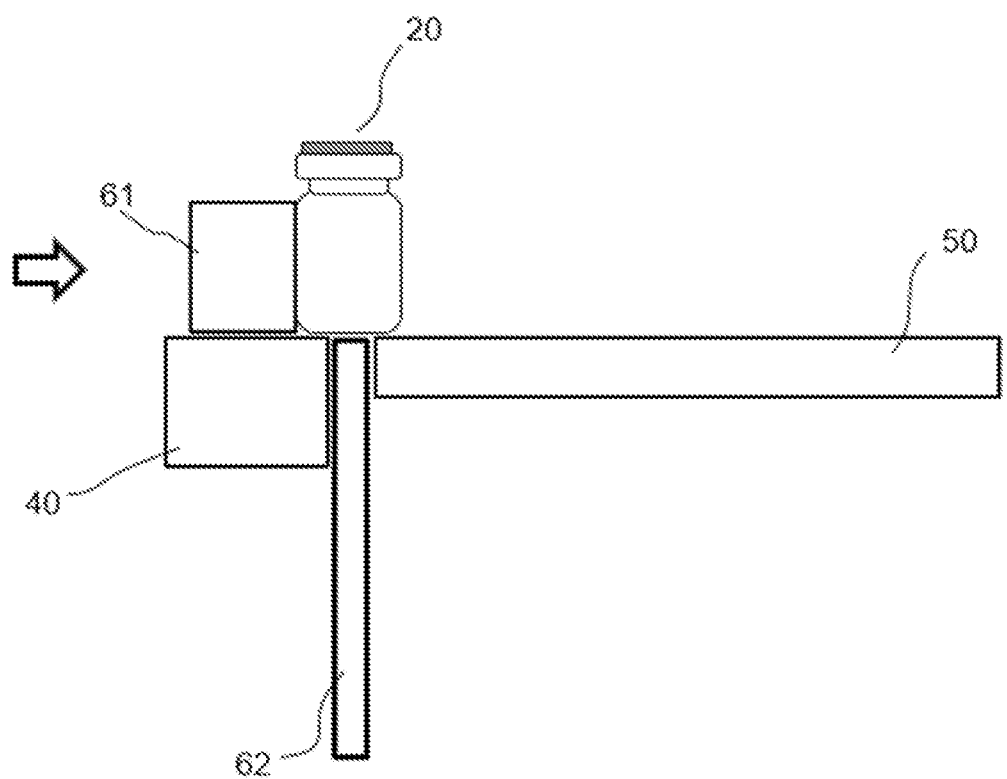
FIG. 6 is a schematic side view of the transport device according to the embodiment.
Figure 7:
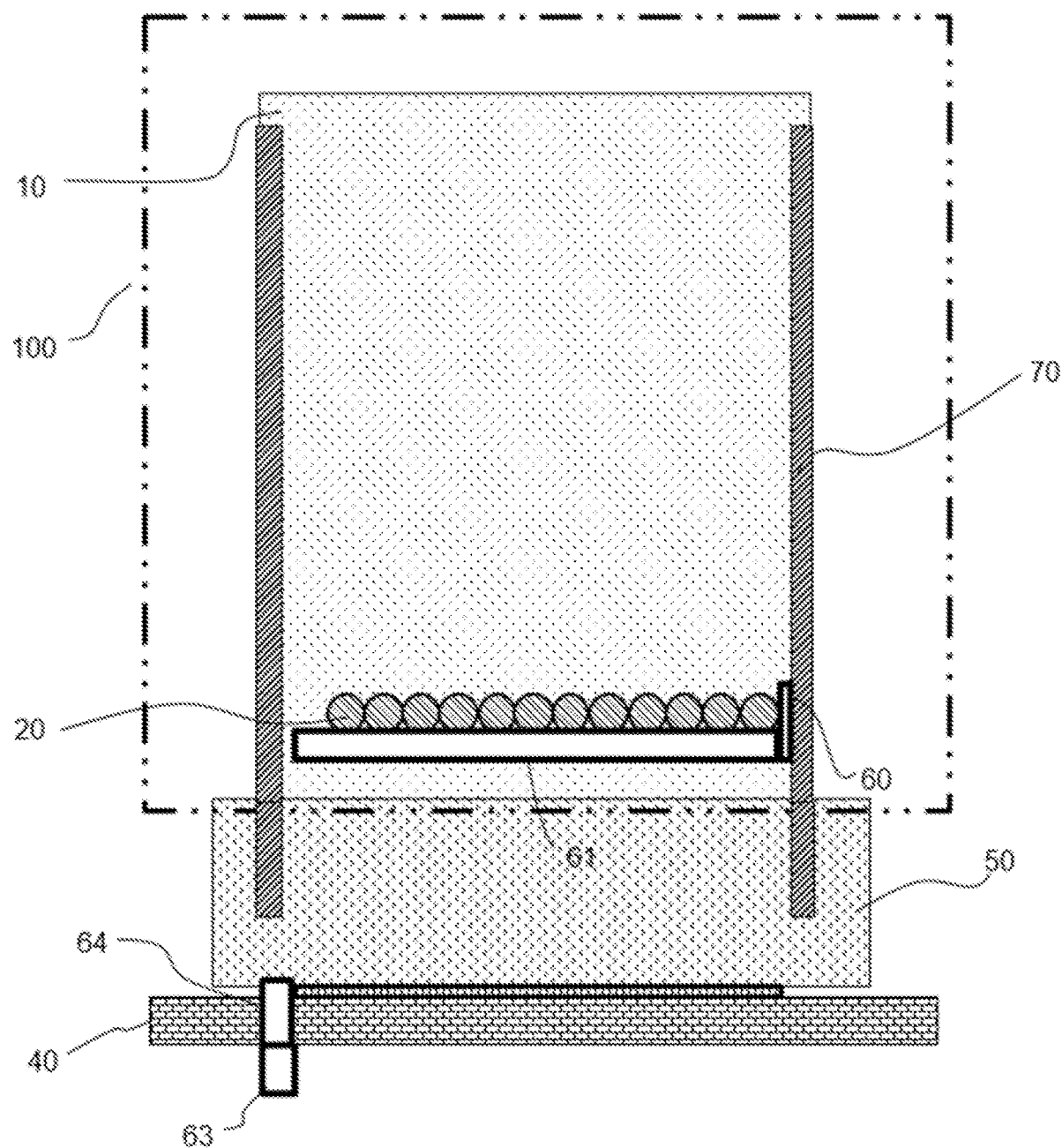
FIG. 7 is a schematic top view of the transport device according to the embodiment.
Figure 8:
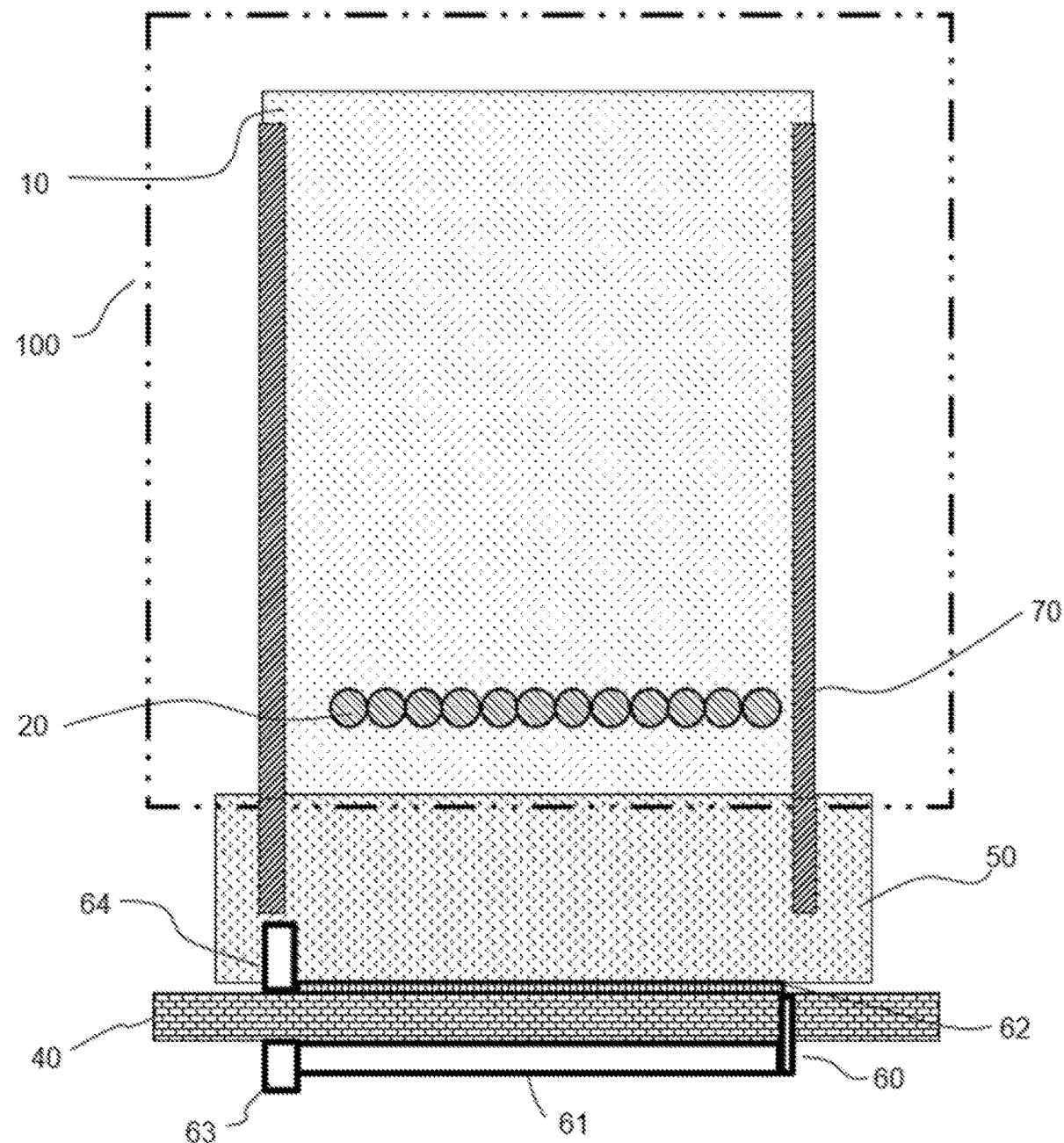
FIG. 8 is a schematic top view of the transport device according to the embodiment.

The pusher 61 is movable in a direction perpendicular to the direction of movement of the conveyor 40 and in the direction parallel to the upper surface of the conveyor 40. As illustrated in FIG. 6 and FIG. 7, the pusher 61 pushes the row of the articles 20 on the conveyor 40 and transfers the row of the articles 20 onto the plate 50 and the plate 10. The row of the articles 20 transferred onto the plate 10 first in a state in which the closed space 100 is empty corresponds to a first row of the articles 20 to be pushed into the closed space 100. The stopper 60 may be fixed to the pusher 61 and move in association with the movement of the pusher 61. As illustrated in FIG. 8, after the row of the articles 20 is transferred, the pusher 61 is retracted to a position which does not pose an impediment of transport of the articles 20 by the conveyor 40. The vertical gate 62 moves upward to a level higher than the upper surfaces of the conveyor 40 and the plate 50, and the approach gate 64 is opened.

Figure 9:
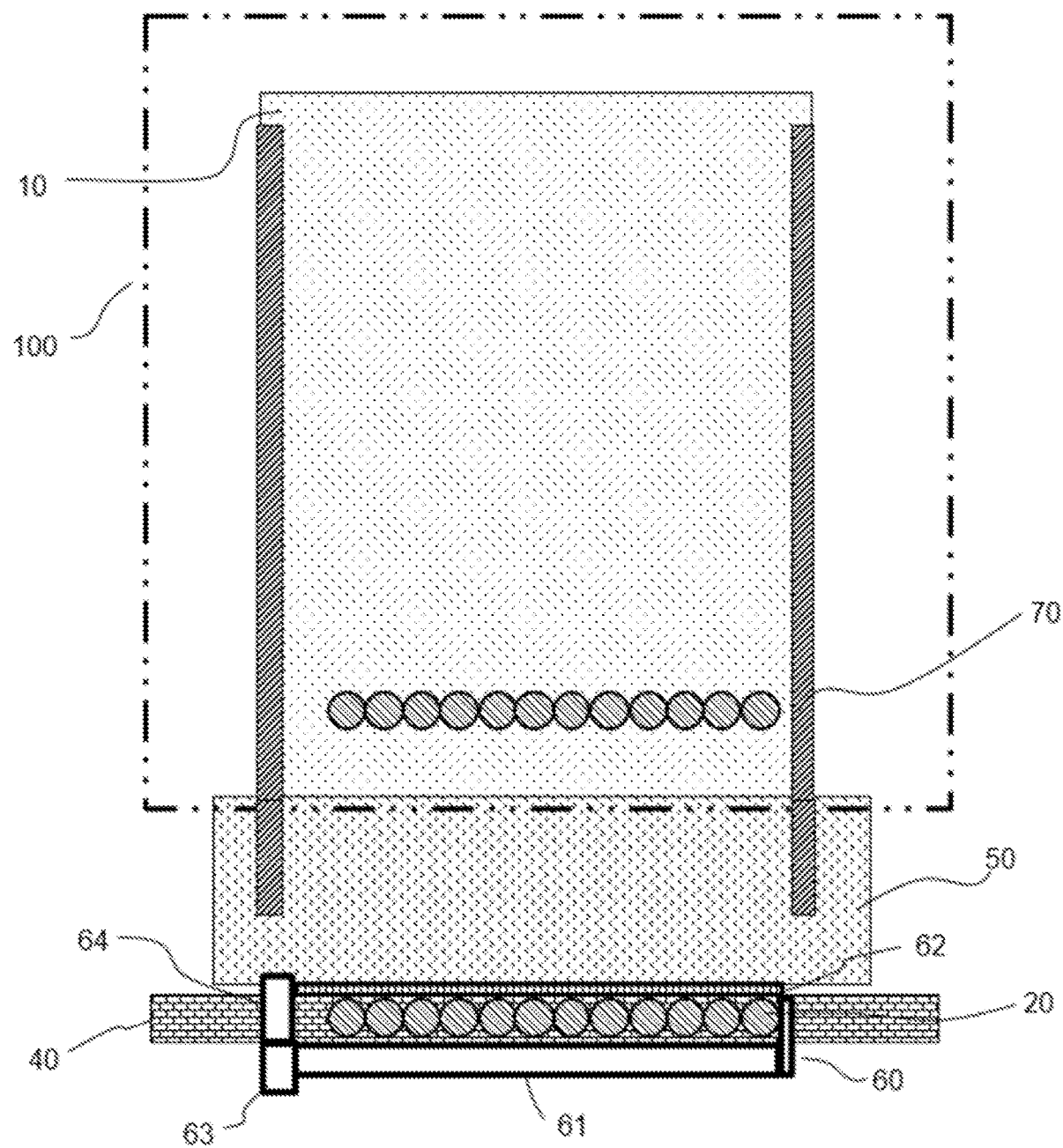
FIG. 9 is a schematic top view of the transport device according to the embodiment.
Figure 10:
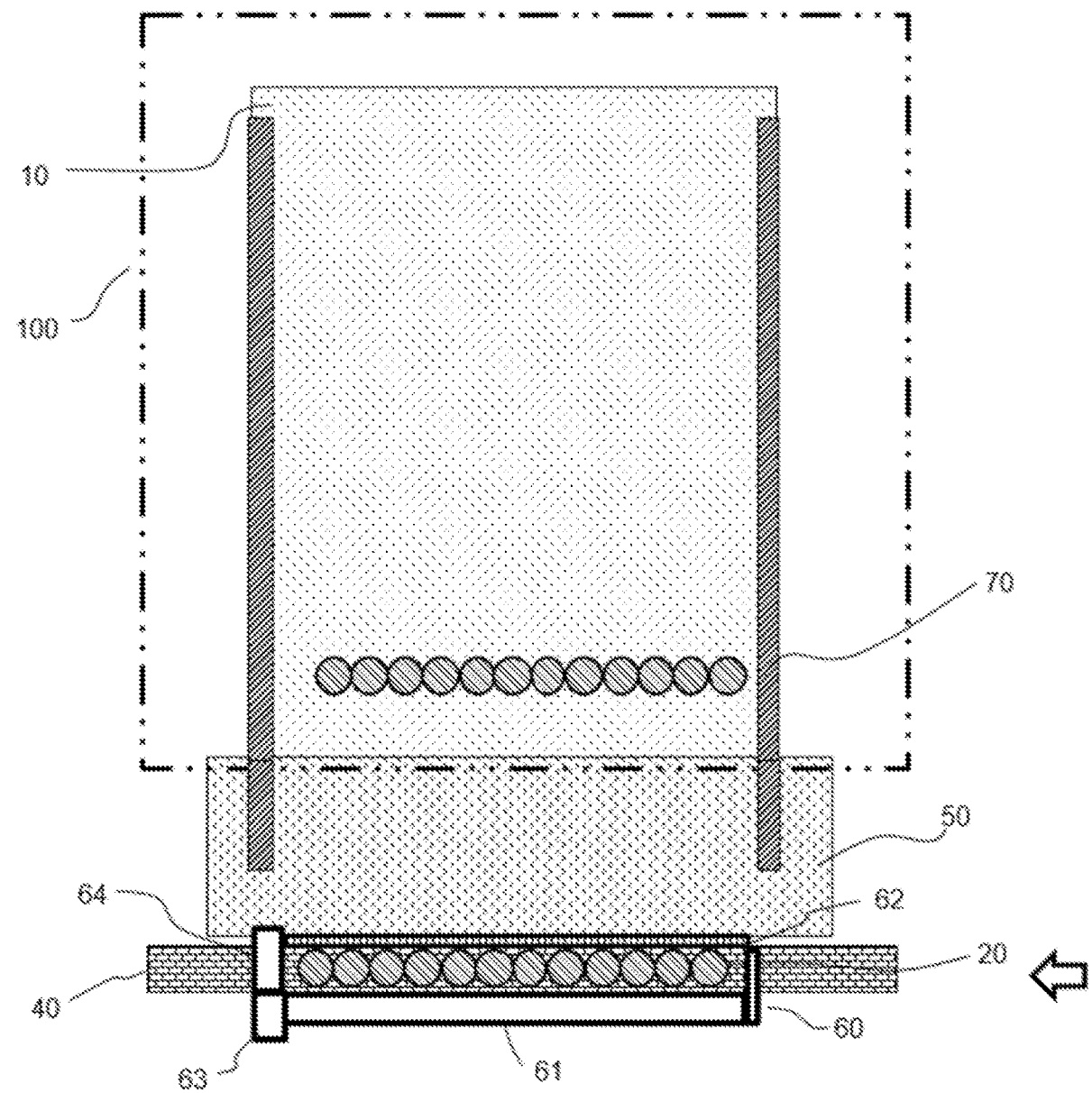
FIG. 10 is a schematic top view of the transport device according to the embodiment.
Figure 11:
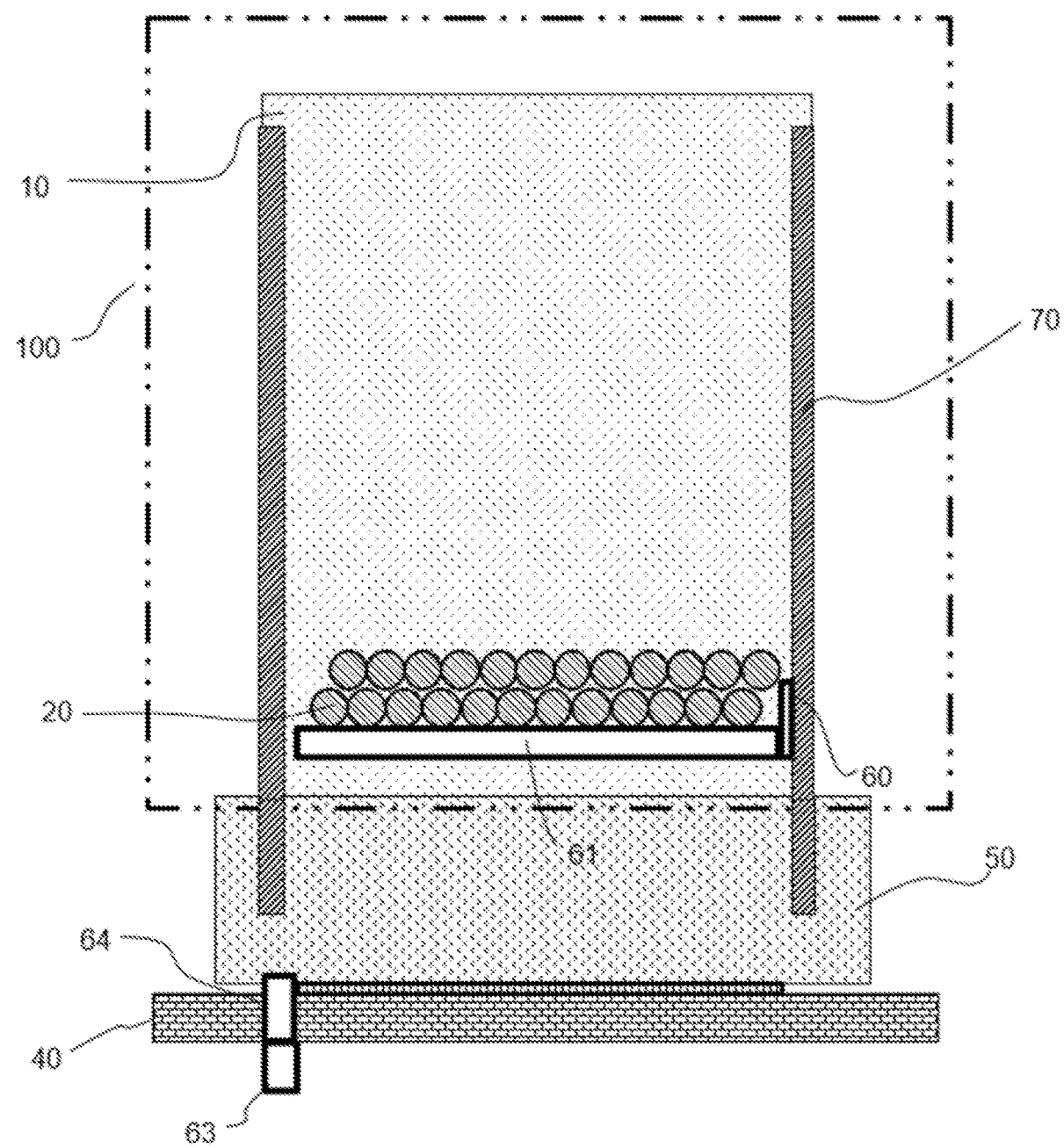
FIG. 11 is a schematic top view of the transport device according to the embodiment.
Figure 12:
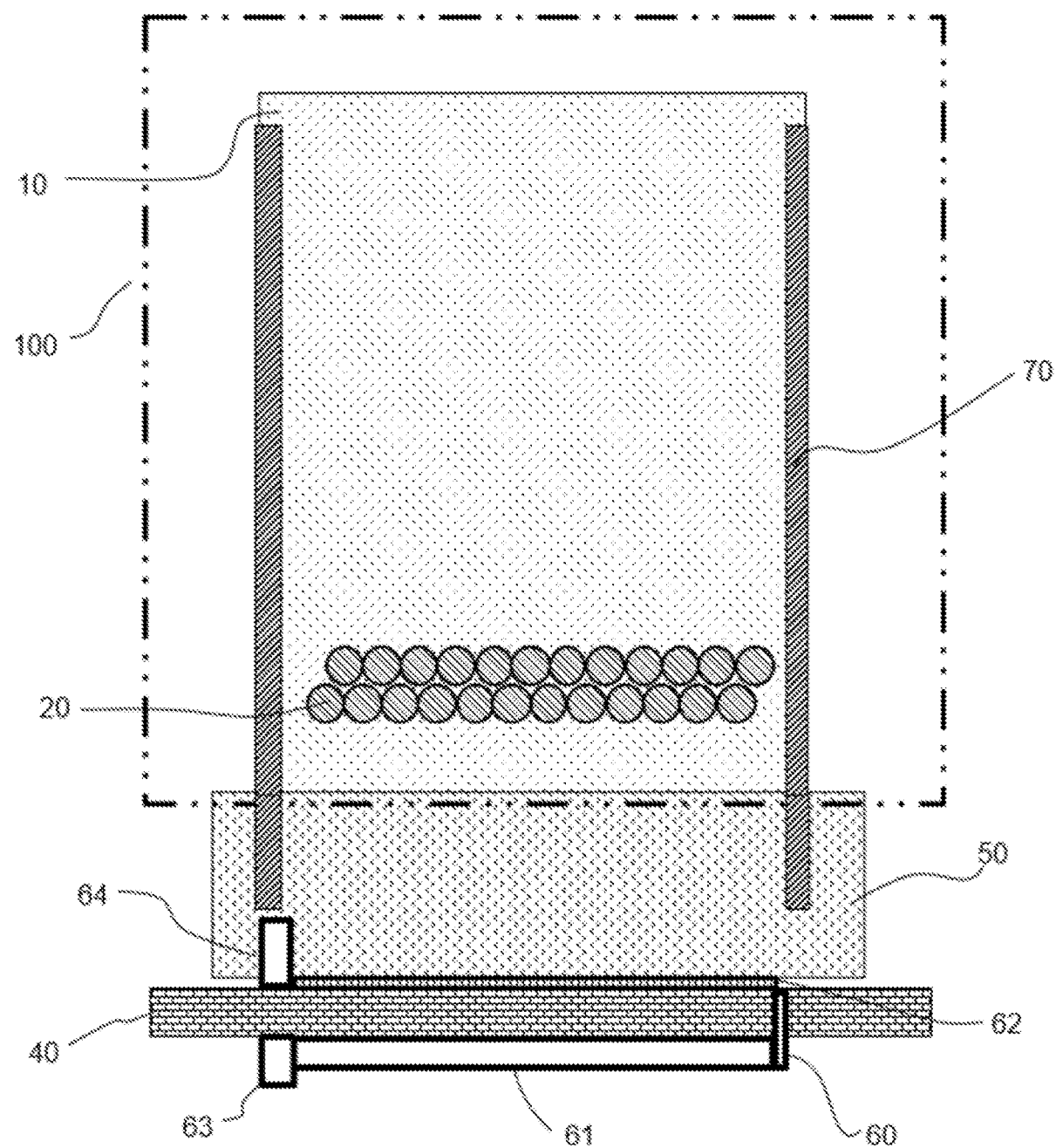
FIG. 12 is a schematic top view of the transport device according to the embodiment.

Subsequently, as illustrated in FIG. 9, the conveyor 40 transports the articles 20, which correspond to the articles 20 in a second row to be pushed into the closed space 100, toward the stopper 60. The head article 20 comes into contact with the stopper 60 and is stopped. After the conveyor 40 transfers a predetermined number of articles 20, the approach gate 64 is closed and the conveyor 40 stops driving. Note that the head of the row of the articles 20 may reach the stopper 60 after the approach gate 64 is closed. Subsequently, as illustrated in FIG. 10, the conveyor 40 retracts the row of the articles 20 in a direction away from the stopper 60 generally by the same distance as the radius of the article 20. Subsequently, as illustrated in FIG. 11, the pusher 61 transfers the row of the articles 20 on the conveyor 40 onto the plate 50 and the plate 10 at least until the articles come into contact with the first row of the articles 20 on the plate 10. The respective centers of the articles 20 in the second row are generally shifted in the direction of the row with respect to the respective centers of the articles 20 in the first row by the same distance as the radius of the article 20. Subsequently, as illustrated in FIG. 12, the pusher 61 is retracted to a position which does not pose an impediment of transport of the articles 20 by the conveyor 40. The vertical gate 62 moves upward to a level higher than the upper surfaces of the conveyor 40 and the plate 50, and the approach gate 64 is opened.

Figure 13:
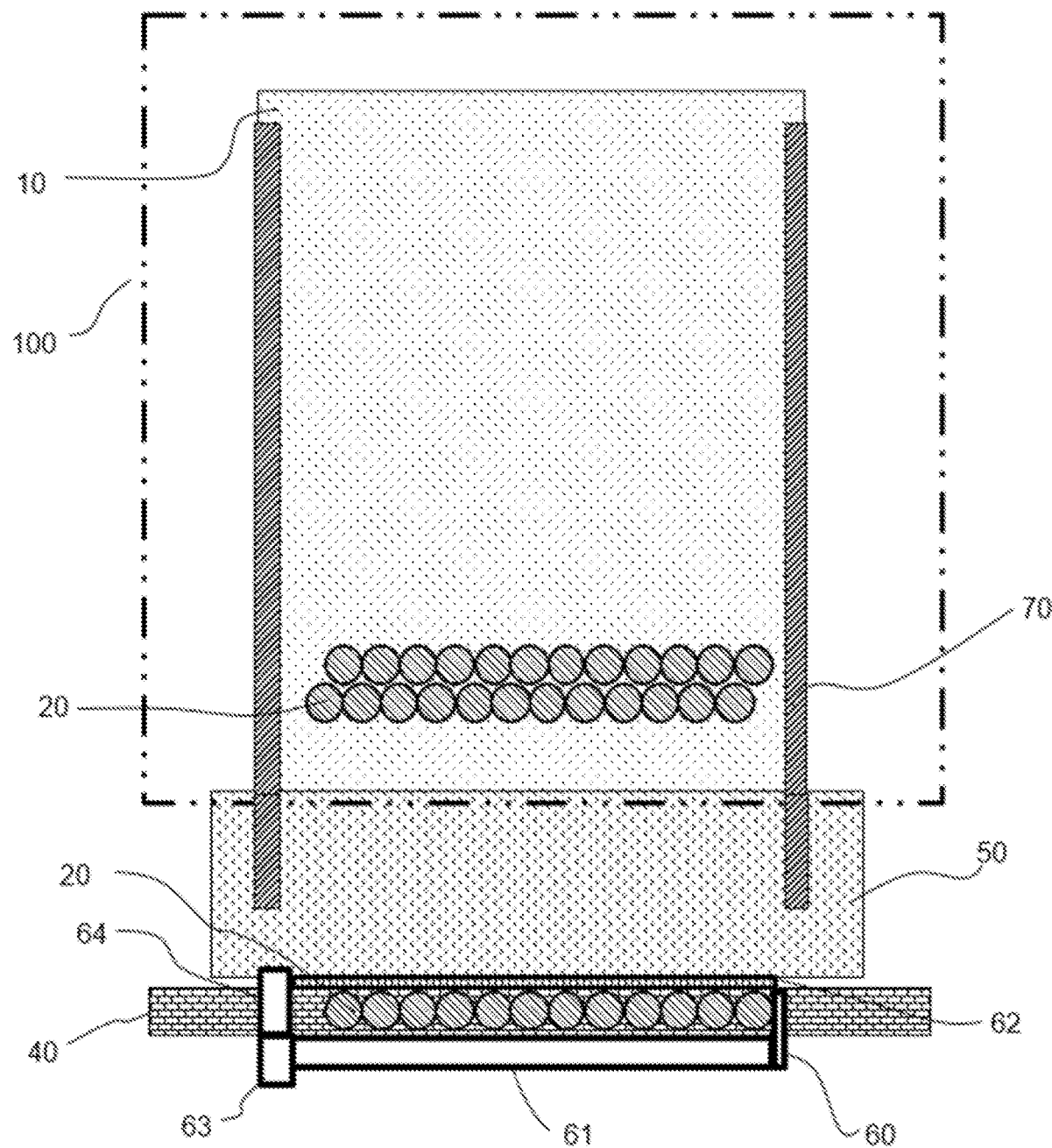
FIG. 13 is a schematic top view of the transport device according to the embodiment.
Figure 14:
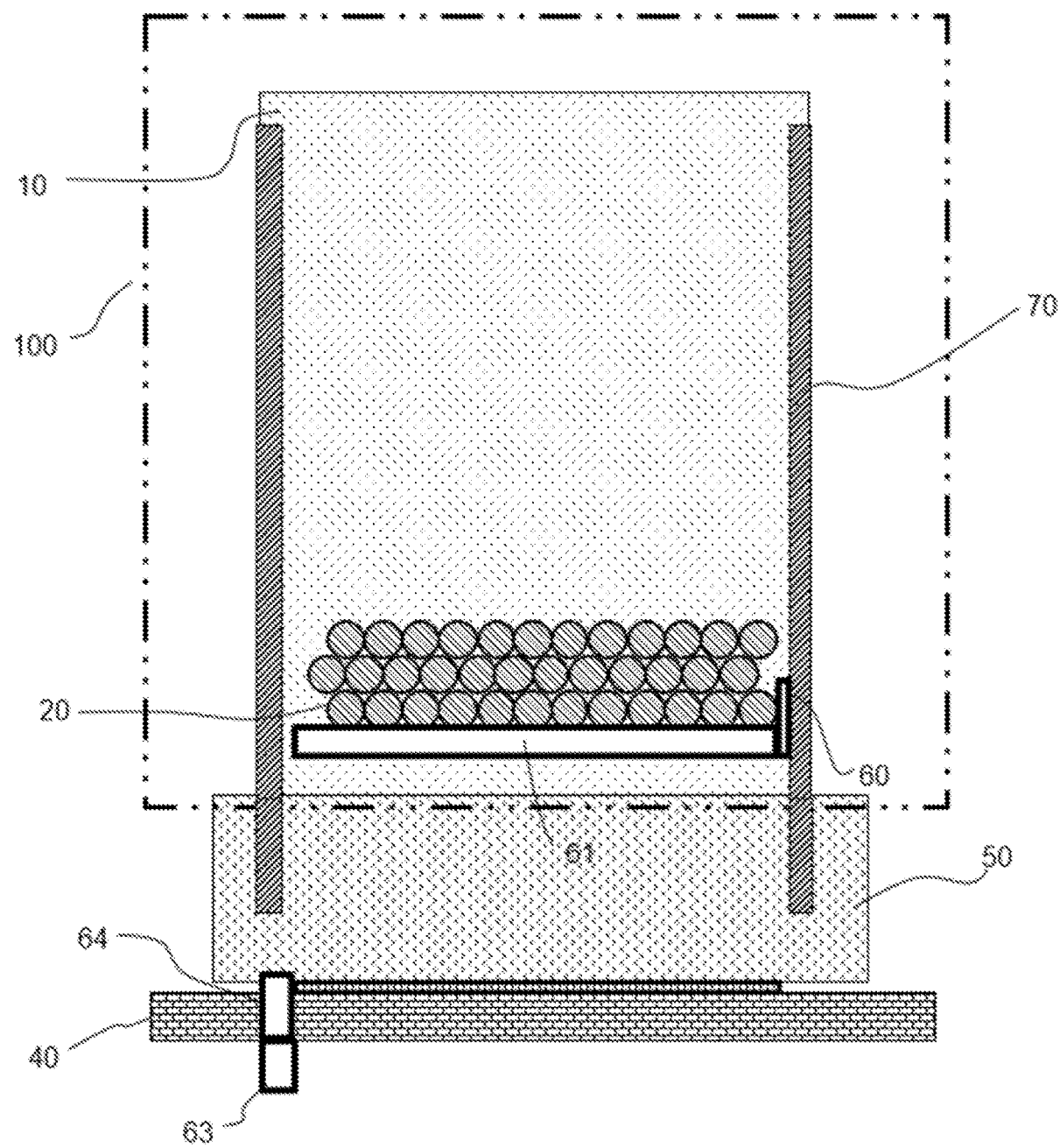
FIG. 14 is a schematic top view of the transport device according to the embodiment.

Subsequently, as illustrated in FIG. 13, the conveyor 40 transports the articles 20, which correspond to the articles 20 in a third row to be pushed into the closed space 100, toward the stopper 60. The head article 20 comes into contact with the stopper 60 and is stopped. After the conveyor 40 transfers a predetermined number of articles 20, the approach gate 64 is closed and the conveyor 40 stops driving. Note that the head of the row of the articles 20 may reach the stopper 60 after the approach gate 64 is closed. Subsequently, as illustrated in FIG. 14, the pusher 61 transfers the row of the articles 20 on the conveyor 40 onto the plate 50 and the plate 10 at least until the articles come into contact with the second row of the articles 20 on the plate 50. The respective centers of the articles 20 in the third row are not shifted in the direction of the row with respect to the respective centers of the articles 20 in the first row. The respective centers of the articles 20 in the third row are generally shifted in the direction of the row with respect to the respective centers of the articles 20 in the second row by the same distance as the radius of the article 20.

From then onward, steps of retracting the articles 20, which correspond to the articles 20 in the rows with ordinals of even numbers stopped by the stopper 60, by the conveyor 40 and then transferring such articles 20 onto the plate 50 and the plate 10 by the pusher 61; and transferring the articles 20, which correspond to the articles 20 in the row with ordinals of odd numbers stopped by the stopper 60 onto the plate 50 and the plate 10 by the pusher 61 without retracting such articles 20 by the conveyor 40 are repeated. In this manner, the staggered arrangement of the articles 20 in the closed space 100 is achieved as illustrated in FIG. 2 by moving the positions of the rows of the articles 20 stopped by the stopper 60 alternately by the conveyor 40 such that the positions of the rows of the articles 20 to be transferred onto the plate 50 are shifted alternately. After the staggered arrangement of a predetermined number of the articles 20 in the closed space 100, a door of the oven or the like that provides the closed space 100 is closed.

In the related art, in order to achieve the staggered arrangement of the articles on the plate, the rows of the articles on the conveyor are moved in the direction of the row by using, for example, a drive unit other than the conveyor, such as a stopper, capable of moving in the direction of the row of the articles. In the closed space such as the freeze dry oven, a clean environment is desired. However, the drive unit may generate dust and thus the drive unit may become an origin of contamination in the closed space. Furthermore, the drive unit needs regular maintenance, which may increase costs of manufacturing the articles.

In contrast, in the transport device according to the embodiment, the conveyor 40 shifts the position of the row of the articles 20 stopped by the stopper 60 alternately such that the positions of the row of the articles 20 to be transferred onto the plate 50 are shifted alternately, and thus the provision of another drive unit for moving the row of the articles on the conveyor 40 in the direction of the row may be eliminated. Therefore, a degree of cleanliness of air around the closed space 100 may be enhanced. In addition, by eliminating the provision of another drive unit for moving the row of the articles on the conveyor 40 in the direction of the row, reduction of the cost for manufacturing the transport device is achieved. Furthermore, by eliminating the provision of another drive unit for moving the row of the articles on the conveyor 40 in the direction of the row, reduction of the cost of maintenance of the transport device and the like is achieved. Therefore, reduction of the cost for manufacturing articles is also achieved.

Other Embodiments

Although the present invention has been described based on the embodiment, description and drawings which constitute part of this disclosure should not be interpreted to limit the present invention. From this disclosure, various alternative embodiments, examples, and operational technologies will become apparent for those skilled in the art. For example, an example in which the articles 20 in the row with ordinals of even numbers stopped by the stopper 60 are retracted by the conveyor 40 without retracting the articles 20 in the rows with ordinals of odd numbers stopped by the stopper 60 by the conveyor 40 has been described in the embodiment. On the other hand, an example in which the articles 20 in the rows with ordinals of odd numbers stopped by the stopper 60 may be retracted by the conveyor 40 without retracting the articles 20 in the row with ordinals of even numbers stopped by the stopper 60 by the conveyor 40. In addition, articles to be transported in or out of the oven are not limited to those including the pharmaceutical products, but may be articles such as food products, beverages, and precision parts, and may include any articles. The oven is not limited to the freeze dry oven, and may be a fermentation oven, or any oven which requires restraint of unevenness in temperature distribution or restraint of generation of dust in the interior. Furthermore, while an example in which the stopper 60 is fixed to the pusher 61 has been described in the embodiment, the stopper 60 may be fixed over the conveyor 40 instead of being fixed to the pusher 61. In this manner, it should be understood that the present invention includes various embodiments which are not described in this specification.

REFERENCE SIGNS LIST

10 . . . plate, 20 . . . article, 40 . . . conveyor, 50 . . . plate, 60 . . . stopper, 61 . . . pusher, 62 . . . vertical gate, 63 . . . counting sensor, 64 . . . approach gate, 70 . . . guide, 100 . . . closed space

The invention claimed is:

1. A transport device comprising:
a plate;
a conveyor configured to transport articles;
a pusher configured to push a row of the articles on the conveyor and transfer the row of the articles onto the plate; and
a stopper configured to restrain movement of the articles by the conveyor and define a head of the row of the articles to be transferred onto the plate by the pusher, wherein
the conveyor moves positions of the rows of the articles stopped by the stopper alternately such that the positions of the rows of the articles transferred onto the plate are shifted alternately, and
the stopper is not capable of moving in a direction of the row of the articles.

2. The transport device according to claim 1, further comprising a vertical gate disposed between the plate and the conveyor, the vertical gate being configured to move upward to prevent the articles from being transferred onto the plate while the articles are moving on the conveyor and to move downward while the row of the articles is being pushed by the pusher.

3. The transport device according to claim 1, further comprising an approach gate configured to restrain the movement of the articles on the conveyor and define a terminal end of the row of the articles to be transferred onto the plate.

4. The transport device according to claim 3, further comprising a counting sensor configured to count a number of the articles received between the stopper and the approach gate.

5. The transport device according to claim 4, wherein the approach gate is closed when the number of the articles reaches a predetermined number.

6. The transport device according to claim 1, wherein the stopper is fixed to the pusher.

7. The transport device according to claim 1, wherein the stopper is fixed over the conveyor.

8. A transport device comprising:
a plate;
a conveyor configured to transport articles;
a pusher configured to push a row of the articles on the conveyor and transfer the row of the articles onto the plate; and
a stopper configured to restrain movement of the articles by the conveyor and define a head of the row of the articles to be transferred onto the plate by the pusher, wherein
the conveyor retracts the position of the row of the articles stopped by the stopper every other time such that the positions of the rows of the articles transferred onto the plate are shifted alternately.

9. The transport device according to claim 8, wherein the articles have a circular cross section and the conveyor retracts the row of the articles by a same distance as a radius of the circular cross section.

10. A freeze dry system comprising:
a freeze dry oven in which a plate is disposed in an interior thereof;
a conveyor configured to transport articles;
a pusher configured to push a row of the articles on the conveyor and transfer the row of the articles onto the plate; and
a stopper configured to restrain movement of the articles by the conveyor and define a head of the row of the articles to be transferred onto the plate by the pusher, wherein
the conveyor moves positions of the rows of the articles stopped by the stopper alternately such that the positions of the rows of the articles transferred onto the plate are shifted alternately, and
the stopper is not capable of moving in a direction of the row of the articles.

* * * * *